Patented Jan. 27, 1953

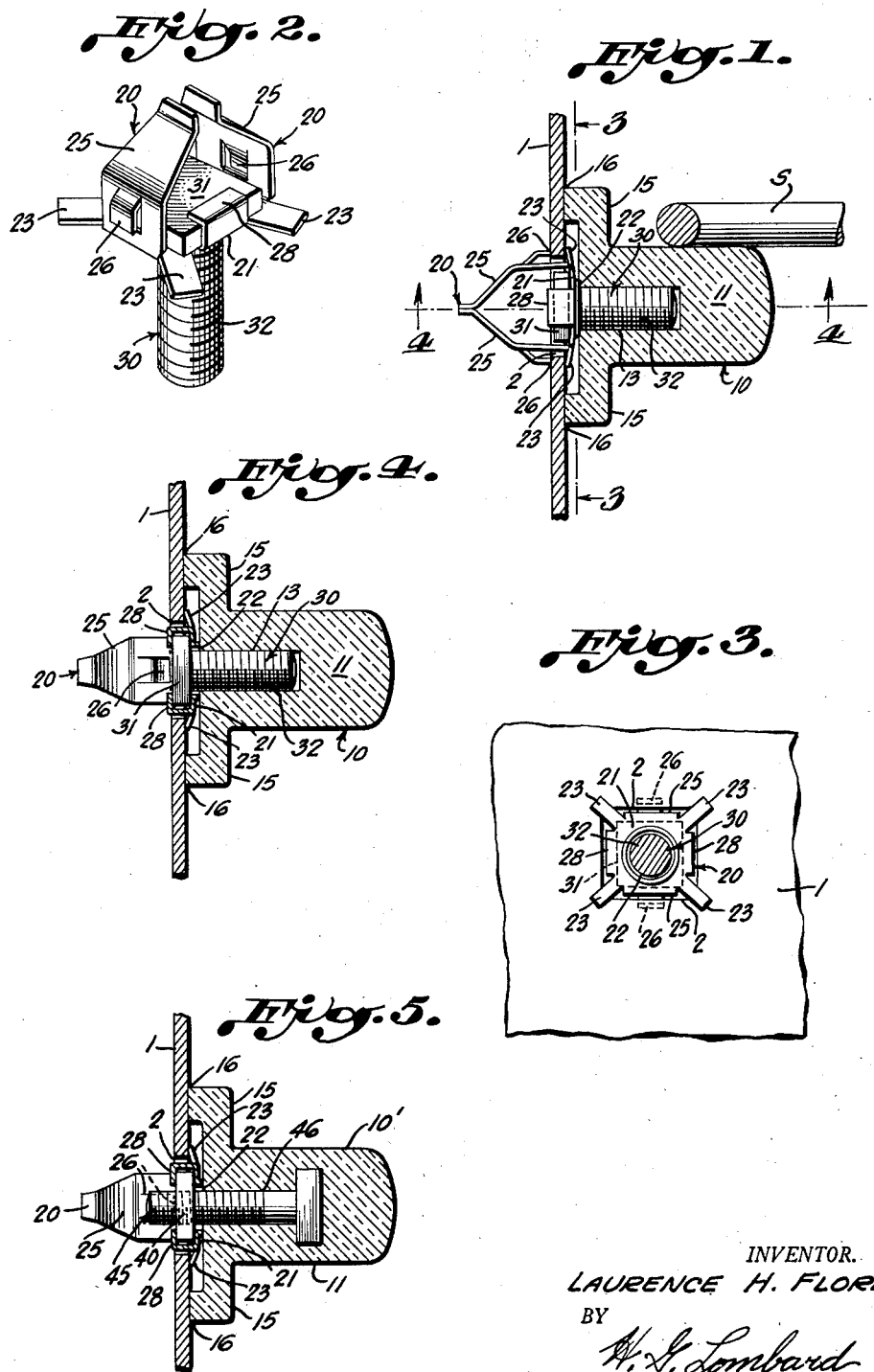

2,626,772

UNITED STATES PATENT OFFICE 2,626,772

SUPPORT

Laurence H. Flora, Cleveland, Ohio, assignor to Tinnerman Products, Inc., Cleveland, Ohio, a corporation of Ohio Application July 18, 1949, Serial No. 105,409

13 Claims. (Cl. 248—239)

This invention relates in general to shelf supports for refrigerators and similar structures, and deals, more particularly, with an improved fastening means for securing such shelf supports in mounted position.

A primary object of the invention is to provide a simplified and inexpensive fastening means for a shelf support or similar object which comprises a bolt or nut member combined with a clip device that may be secured to a wall or panel by an operation taking place entirely from the outer or forward side thereof. Such a procedure is necessary and desirable in many constructions as the final step in a method of assembly for attaching or mounting an object onto a supporting wall or panel which is not conveniently or readily accessible at the rearward side thereof to complete the mounting of the shelf support or other object.

Another object of the invention is to provide such a fastening means for a shelf support or other object which comprises an attaching means in the form of a spring clip that operates in the manner of a snap fastener to secure a bolt or nut in attached position on a supporting wall or panel for mounting a shelf support or other object thereon. The arrangement, accordingly, is such that the improved fastening means of the invention provides a mounting for a shelf support which combines the strength and durability of a bolt and nut fastening member with the speed and facility provided by the spring clip attaching means.

Further objects and advantages and other new and useful features in the construction, arrangement and general combination of parts will be readily apparent as the following description proceeds with reference to the accompanying drawings, for purposes of illustration but not of limitation, in which like reference characters designate like parts throughout, and in which:

Fig. 1 is a vertical sectional view through the wall of a refrigerator, or the like, showing the mounting of a shelf support or other object in accordance with the invention;

Fig. 2 is a perspective view showing the combined fastening means in accordance with the invention comprising a spring clip attaching member connected to a stud bolt for mounting the shelf support or other object;

Fig. 3 is a sectional view along line 3—3 of Fig. 1 showing the fastening means in attached position in the panel opening;

Fig. 4 is a sectional view of Fig. 1 along line 4—4, looking in the direction of the arrows; and Fig. 5 is a sectional view similar to Fig. 4 showing an alternate construction in which the spring clip serves as a holder for a nut adapted to receive a bolt carried by a shelf support or other object to be mounted.

Referring now, more particularly, to the drawings, Figs. 1 and 4 show a preferred form of shelf supporting stud 10 as attached to a wall or panel 1 defining the inner casing or lining of a refrigerator. Such a wall or panel 1 may, of course, be a fragment of any other panel member to which it is desired to attach or mount a similar object such as a knob or handle, or the like, in accordance with the invention. In the present example, the shelf support 10 is shown as provided with a projecting stud portion 11 defining a rest for the peripheral beading S, Fig. 1, of any suitable shelf to be supported in the refrigerator. The shelf S is supported on a series of such studs 11 secured in individual holes or socket openings 2 provided in the inner casing or lining of the refrigerator along the path which the shelf is to be supported in the refrigerator. The socket openings 2 are usually punched in the panel constituting the refrigerator lining or other wall member prior to the assembly thereof in a completed structure whereupon the socket openings become accessible from one side only; and it is this condition which makes it essential that the securing means for mounting the supporting stud be capable of installation to a complete and fully effective positive fastening engagement in a socket opening entirely from the accessible side of the wall member. In the present example, the socket openings 2 are shown provided in a generally rectangular or square shape but, of course, such openings may be provided in a circular or other selected configuration.

The shelf support 10 preferably is made of hardened plastic material and in the molding thereof may be readily provided with a threaded bore 13 or a similar threaded bore defined by a suitable threaded insert, together with a flange or skirt 15 having a free edge serving as bearing surface 16. As shown in Fig. 2, the securing means comprises a sheet metal spring clip 20 combined with a bolt 30 having a threaded shank 32 which is adapted to be received in such threaded bore 13 in the shelf supporting stud.

The spring clip 20 is a relatively simple article of manufacture which may be readily provided from a small inexpensive piece of sheet metal, preferably spring metal or cold rolled metal having spring-like characteristics. The sheet metal section forming the spring clip is so provided as to define a central base or body portion 21 provided with a bolt passage 22, Fig. 4. The corners of the base or body portion 21 include lateral projections or tabs 23 which are adapted to overlap the socket opening 2 in the panel 1 to retain the fastener in attached position and otherwise prevent the fastener from passing through the socket opening during the assembling operation. Preferably said tabs 23 are bent slightly downwardly toward the clip shank in order to serve as a yieldable take-up means for tensioning the clip in attached position.

The opposite end portions of the spring clip adjoining the base or body portion 21 are bent in the same general direction to define a pair of spring arms or legs 25 having their free ends extending inwardly toward each other but spaced slightly apart in normal untensioned relation as illustrated in Fig. 2. The spring legs 25 are provided with suitable shoulders and, in the present example, such shoulders are formed by a pair of stamped out lug or tongue elements 26, the extremities of which are spaced from the tabs 23 a distance approximating the thickness of the wall or panel 1 adjacent the socket opening 2.

The sides of the clip adjoining base or body portion 20 include flanges 28 which are adapted to be bent inwardly toward each other over the head 31 of the bolt 30 in assembled relation therewith. The flanges 28 extend outwardly in initial form to permit the bolt 30 to be assembled with the clip by passing the bolt shank 32 through the bolt passage in the base or body portion 21 of the clip to the assembled relation shown in Fig. 2, whereupon said flanges 28 are bent inwardly over the bolt head 31 to retain the clip and bolt in assembled relation.

The completed fastening device thus provided, as shown in Fig. 2, is easily and quickly assembled with the shelf support 10 by threading the bolt shank 32 into the threaded bore 13 in said shelf support to a position in which the fastening device projects slightly beyond the bearing surface 16.

In attaching the shelf support, the clip shank defined by the spring arms or legs 25 is inserted into the socket opening 2 and pushed axially until the corner projections or tabs 23 on the clip engage the outer surface of the wall or panel 1. In this relation, the locking shoulders 26 snap through the socket opening and engage the adjacent marginal portions of the socket opening 2 at the rearward side of the wall or panel 1, the corner tabs 23 yielding slightly as necessary for this action. In the initial application of the clip shank in the socket opening, the shank legs 25 are compressed toward each other from their normal spaced apart relation shown in Fig. 2 to abutting relation as seen in Fig. 1. Such abutting relation of the shank legs 25 stiffens and rigidifies the same under tension in applied position in the socket opening 2 and otherwise retains the locking shoulders 26 against movement in positive abutting relation with the engaged marginal portions of the socket opening. Also, inasmuch as the flat surfaces of the spring legs or arms 25 are in engagement with the straight edges of the socket opening 2, the clip is maintained in fixed, nonrotatable position in said socket opening.

Accordingly, after the spring clip member 20 has been thus seated in initially applied position in the socket opening 2, the installation is then easily and quickly tightened by rotating the shelf support 10 bodily as necessary to draw the bolt shank 31 axially and thereby pull the locking shoulders 26 on the arms 25 of the spring clip into tightened positive engagement under tension with the marginal portions of said socket opening 2.

In this tightening of the shelf supporting stud 10 in its final applied mounted position, it is to be noted that the main part thereof which bears directly on the exposed face of the wall 1 is the peripheral bearing surface 16 of the flange 15. Thus, the actual bearing area of the shelf support 10 not only is reduced but extends over a relatively wide portion of said wall or panel. And since the wall 1 usually has an enameled or porcelain finish, this arrangement is highly advantageous in that when a mounted supporting stud is put to use as by placing an article on the shelf S supported thereby, the resultant bending stress transmitted to said wall 1 is necessarily decreased and distributed over a comparatively large area wherefore danger of cracking or chipping of the enamel is minimized and, in fact, practically eliminated.

Fig. 5 discloses a similar shelf support mounting in which the same spring clip 20 is employed in an equivalent construction wherein a nut 40 is retained by the spring clip to serve as a head member in the same manner as the bolt head 31 in the construction of Figs. 1–4 inclusive. The shelf support 10' also is of the same general construction and has molded therewith or is otherwise provided with a separate threaded bolt shank 45 which projects outwardly beyond the peripheral skirt 16 of said shelf support. In the present example, the separate bolt shank 45 is provided by a separate bolt 46 molded together with the shelf support 10' and said bolt shank is adapted to be threaded into the nut 40 such that said nut serves as a head member for said bolt in the same manner as the bolt head 31 as described with reference to Figs. 1–4 inclusive.

Accordingly, with the head member defined by said nut 40 thus provided, the spring clip 20 is secured thereto in the same manner by the inwardly bent flanges 28. In attaching the shelf support, the bolt shank 45 on the shelf support is likewise threaded into said nut 40 through the bolt passage 22 in the base or body portion 21 of the clip to a position in which the combined spring clip 20 and nut 40 project slightly outwardly beyond the peripheral skirt 16 of the shelf support. The assembly is then applied by inserting the clip shank into the socket opening 2 in the wall or panel 1 as described with reference to Figs. 1–4, inclusive, and the shelf support 10 rotated bodily to tighten the same in a similar manner against the wall or panel 1 to provide an equivalent and substantially identical completed installation of the shelf support.

The spring clip 20 preferably is constructed of relatively thin sheet metal the thickness of which is selected according to service requirements and the predetermined size of the parts to be secured. The spring clip is most effective when provided of spring metal suitably spring tempered and otherwise treated to give the desired toughness and hardness, particularly in the case of devices which are subject to constant usage in heavy duty applications. A cheap but highly effective spring clip may be provided from cold rolled metal such as cold rolled steel which is untempered but of a spring metal nature and capable of providing an effective and reliable securing device, as and for the purposes described.

While the invention has been described in detail with specific examples, such examples are intended as illustrations only inasmuch as various modifications within the spirit and scope of the invention are fully contemplated.

What is claimed is:

1. Fastening means comprising a sheet metal clip member bent to define a base having a bolt passage, a pair of spaced spring arms extending from said base adapted to retain the clip in an opening in a part, a return bent flange on said base between said spring arms, a head member attached to said base of the clip by said flange and a bolt shank connected to said head member extending through said passage in the base of the clip in the opposite direction from said spring arms and outwardly from said base of the clip.

2. Fastening means comprising a sheet metal clip member bent to define a base having a bolt passage, a pair of spaced spring arms extending from said base adapted to retain the clip in an opening in a part and provided with shoulders for locking the clip in said opening, inturned flanges on said base of the clip between said spring arms, a head member attached to said base of the clip by said inturned flanges and a bolt shank connected to said head member extending through said passage in the base of the clip in the opposite direction from said spring arms and outwardly from said base of the clip.

3. Fastening means comprising a sheet metal clip member bent to define a base having a bolt passage and a pair of spaced spring arms extending from said base adapted to retain the clip in an opening in a part, and a bolt having its head attached to said base of the clip between said spring arms and its shank extending through said passage in the base of the clip in the opposite direction from said spring arms and outwardly from said base of the clip.

4. Fastening means comprising a sheet metal clip member bent to define a base having a bolt passage, a pair of spaced spring arms extending from said base adapted to retain the clip in an opening in a part and elements defining shoulders adapted to lock the clip in said opening, inturned flanges on said base between said spring arms, and a bolt member having its head attached to said base of the clip by said inturned flanges with the shank of the bolt extending through said passage in the base of the clip in the opposite direction from said spring arms and outwardly from said base of the clip.

5. Fastening means comprising a sheet metal clip member bent to define a base having a bolt passage, a pair of spaced spring arms extending from said base adapted to retain the clip in an opening in a part and elements defining shoulders for locking the clip in said opening, inturned flanges on said base of the clip between said spring arms, and a head member comprising a nut attached to said base of the clip by said inturned flanges and adapted to engage a bolt passing through said bolt passage in the base of the clip in the opposite direction from said spring arms and outwardly from said base of the clip.

6. A mounting comprising a supporting wall having an opening therein, a clip in said opening comprising a sheet metal body bent to define a base having a bolt passage, a pair of spaced spring arms extending from said base through said opening and provided with means locking the clip in said opening, a flange on said base between said spring arms, a head member attached to said base of the clip by said flange and received in said opening in said supporting wall, and a bolt shank connected to said head member extending through said passage in the base of the clip in the opposite direction from said spring arms, and an object secured on said bolt shank.

7. A mounting comprising a supporting wall having an opening therein, a clip in said opening comprising a sheet metal body bent to define a base having a bolt passage, a pair of spaced spring arms extending from said base through said opening and provided with shoulders locking the clip in said opening, inturned flanges on said base of the clip between said spring arms, a head member attached to said base of the clip by said inturned flanges and received in said opening in said supporting wall, and a bolt shank connected to said head member extending through said passage in the base of the clip in the opposite direction from said spring arms, and a device secured on said bolt shank.

8. A mounting comprising a supporting wall having an opening therein, a clip in said opening comprising a sheet metal body bent to define a base having a bolt passage and a pair of spaced spring arms extending from said base and retaining the clip in said opening, a bolt having its head attached to said base of the clip between said spring arms and received in said opening in said supporting wall with its shank extending through said passage in the base of the clip in the opposite direction from said spring arms and a device secured on said bolt shank.

9. A mounting comprising a supporting wall having an opening therein, a clip in said opening comprising a sheet metal body bent to define a base having a bolt passage and a pair of spaced spring arms extending from said base and retaining the clip in said opening, a nut defining a head member attached to said base of the clip between said spring arms and received in said opening in said supporting wall, a bolt shank connected to said nut extending through said passage in the base of the clip in the opposite direction from said spring arms and a device secured on said bolt shank.

10. A mounting comprising a supporting wall having an opening therein, a clip in said opening comprising a sheet metal body bent to define a base having a bolt passage, a pair of spaced spring arms extending from said base through said opening and elements defining shoulders locking the clip in said opening, inturned flanges on said base between said spring arms, a bolt having its head attached to said base of the clip by said inturned flanges with its shank extending through said passage in the base of the clip in the opposite direction from said spring arms, and a device secured on said bolt shank.

11. A mounting comprising a supporting wall having an opening therein, a clip in said opening comprising a sheet metal body bent to define a base having a bolt passage, a pair of spaced spring arms extending from said base through said opening and elements defining shoulders locking the clip in said opening, inturned flanges on said base of the clip between said spring arms, a nut defining a head member attached to said base of the clip by said inturned flanges and received in said opening in said supporting wall, a bolt shank connected to said nut extending through said passage in the base of the clip, and a device secured on said bolt shank.

12. A shelf support mounting comprising a supporting wall having an opening therein, a clip in said opening comprising a sheet metal body bent to define a base having a bolt passage and a pair of spaced spring arms extending from said base and retaining the clip in said opening, a head member attached to said base of the clip between said spring arms and received in said opening in said supporting wall, and a bolt shank connected to said head member extending through said passage in the base of the clip in the opposite direction from said spring arms, and a shelf supporting device on said bolt shank.

13. A shelf support mounting comprising a supporting wall having an opening therein, a clip in said opening comprising a sheet metal body bent to define a base having a bolt passage, a pair of spaced spring arms extending from said base and retaining the clip in said opening, a flange on said base between said spring arms, a head member attached to said base of the clip by said flange and received in said opening in said supporting wall, and a bolt shank connected to said head member extending through said passage in the base of the clip from the opposite direction from said spring arms, and a shelf supporting device on said bolt shank.

LAURENCE H. FLORA.

REFERENCES CITED

The following references are of record in the file of this patent:

UNITED STATES PATENTS

| Number | Name | Date |
|---|---|---|
| 1,433,786 | Carr | Oct. 31, 1922 |
| 1,961,935 | Knapp | June 5, 1934 |
| 2,303,148 | Tinnerman | Nov. 24, 1942 |
| 2,391,046 | Tinnerman | Dec. 18, 1945 |